United States Patent
Rodniansky et al.

(10) Patent No.: US 12,430,460 B2
(45) Date of Patent: Sep. 30, 2025

(54) SENSITIVE STORED PROCEDURE IDENTIFICATION IN REAL-TIME AND WITHOUT DATA EXPOSURE

(71) Applicant: International Business Machines Corporation, Armonk, NY (US)

(72) Inventors: Leonid Rodniansky, Allston, MA (US); Mikhail Shpak, New York, NY (US); Tania Butovsky, Needham, MA (US); Shidong Shan, Shirley, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 18/244,599

(22) Filed: Sep. 11, 2023

(65) Prior Publication Data

US 2025/0086305 A1  Mar. 13, 2025

(51) Int. Cl.
*G06F 21/62* (2013.01)

(52) U.S. Cl.
CPC ............... *G06F 21/6227* (2013.01)

(58) Field of Classification Search
CPC .... G06F 21/554; G06F 21/577; G06F 21/604; G06F 21/6218; G06F 21/6245; G06F 21/6227; G06F 21/6281; H04L 63/1433; H04L 63/20
See application file for complete search history.

(56) References Cited

U.S. PATENT DOCUMENTS

| | | | |
|---|---|---|---|
| 5,572,673 A | 11/1996 | Shurts | |
| 6,289,344 B1 | 9/2001 | Braia et al. | |
| 6,292,900 B1 | 9/2001 | Ngo et al. | |
| 6,636,855 B2 | 10/2003 | Holloway et al. | |
| 8,056,141 B2 | 11/2011 | Shulman et al. | |
| 8,776,180 B2 | 7/2014 | Kumar et al. | |
| 11,010,492 B1 * | 5/2021 | Kayyoor | G06F 16/9535 |
| 11,481,508 B2 | 10/2022 | Butovsky et al. | |
| 2002/0184218 A1 | 12/2002 | Bailey et al. | |

(Continued)

OTHER PUBLICATIONS

Wei et al., Preventing SQL injection attacks in stored procedures, Australian Software Engineering Conference (ASWEC'06), IEEE, 2006.

*Primary Examiner* — Kevin Bechtel
(74) *Attorney, Agent, or Firm* — Garg Law Firm, PLLC; Rakesh Garg; Anthony Mauricio Pallone

(57) ABSTRACT

An embodiment initiates, by a sensitive stored procedure identification engine, a periodic discovery process on a database server to identify a stored procedure and assign a first sensitivity score to the stored procedure based on a searching of a sensitive data pattern in the stored procedure. The embodiment assigns in real-time, by the sensitive stored procedure identification engine responsive to receiving a stored procedure call by a client over a network, a second sensitivity score to the stored procedure based on a searching of a sensitive data pattern in a response to the stored procedure call. The embodiment compares, by the sensitive stored procedure identification engine, the first sensitivity score and the second sensitivity score. The embodiment determines, by the sensitive stored procedure identification engine based on the comparison, to allow a response to the stored procedure call to the client.

20 Claims, 6 Drawing Sheets

(56) References Cited

U.S. PATENT DOCUMENTS

| | | |
|---|---|---|
| 2006/0130150 A1 | 6/2006 | Garza-Gonzalez et al. |
| 2017/0104756 A1* | 4/2017 | Rosenthal ............... H04L 63/20 |
| 2023/0114821 A1* | 4/2023 | Thomas .............. H04L 63/1433 |
| | | 726/23 |

* cited by examiner

SENSITIVE STORED PROCEDURE IDENTIFICATION IN REAL-TIME AND WITHOUT DATA EXPOSURE

BACKGROUND

The present invention relates generally to security of database stored procedures. More particularly, the present invention relates to a method, system, and computer program for sensitive stored procedure identification in real-time without data exposure and for prevention of sensitive data security breaches.

Stored procedures are sets of commands stored inside a database. These commands can be executed to perform specific operations or functions within the database. Unlike ordinary queries, stored procedures are precompiled. This pre-compilation helps in speeding up the execution, thereby improving the overall performance of database interactions. By accepting input parameters, stored procedures allow for a great deal of flexibility. The same procedure can be used for various tasks across different applications or users by simply changing the input data. This adaptability makes stored procedures an efficient and versatile tool in managing data and streamlining operations within a database.

SUMMARY

The illustrative embodiments provide for sensitive stored procedure identification without data exposure.

An embodiment includes initiating a periodic discovery process on a database server to identify a stored procedure and assign a first sensitivity score to the stored procedure based on a searching of a sensitive data pattern in the stored procedure, based on for instance stored procedure database objects and data. A technical advantage of this process is establishing an initial benchmark for sensitivity, ensuring that stored procedures are not left unchecked or improperly categorized. This proactive measure helps in identifying potential vulnerabilities or data breaches early on, thereby enhancing the security profile of the database system.

The embodiment also includes assigning, responsive to receiving a stored procedure call by a client, a second sensitivity score to the stored procedure based on a searching of the sensitive data pattern in a response to the stored procedure call intercepted over a network. The immediate responsiveness of this process provides a dynamic approach to threat assessment. By doing so, any changes in the environment or the nature of calls can be rapidly identified and adjusted for, making the system agile in addressing evolving security challenges.

The embodiment also includes comparing the first sensitivity score and the second sensitivity score. This comparison provides a real-time audit mechanism. By juxtaposing the initial assessment with the current state of affairs, it ensures that deviations are not merely noted but evaluated in the context of their potential impact. This process underscores the importance of continuous monitoring in maintaining a robust security posture.

The embodiment also includes determining, based on the comparison, to allow a response to the stored procedure call to the client. The decision to permit or deny a response based on the sensitivity score comparisons introduces a granular control mechanism. It acts as a safeguard, ensuring that even if potentially harmful calls are made, they do not necessarily translate into actions that might jeopardize the system.

Taken as a whole, this embodiment creates a comprehensive security apparatus for database interactions centered around stored procedures. By continually evaluating and re-evaluating the sensitivity scores and using them as a determinant for action, the system not only recognizes potential threats but also evolves to mitigate them actively. The cumulative effect is a resilient database environment, markedly reducing the likelihood of unauthorized access or data breaches.

In an embodiment, assigning a sensitivity score may involve extracting a plurality of object names from a stored procedure source associated with the stored procedure. Upon extraction, a plurality of collections associated with these object names are searched for a sensitive data pattern. The sensitivity score is then assigned based on the identified sensitive patterns within these collections. A technical advantage of this approach lies in the comprehensive assessment of the stored procedure's interactions. This method delves into associated objects and their relevant collections, ensuring that potential vulnerabilities and sensitive data interactions are identified and understood holistically, providing a richer context and higher accuracy.

In an embodiment, the searching for the sensitive data pattern includes applying at least one of a regular expression, a wildcard search, and a machine learning model. The diversity of search methods offers the benefit of comprehensive coverage. For instance, while regular expressions might pinpoint specific patterns effectively, machine learning models can adapt and recognize novel patterns, ensuring the system remains robust even in the face of evolving threat vectors.

In an embodiment, assigning the sensitivity score may include identifying a first sensitive data pattern in the stored procedure source; identifying a second sensitive data pattern in the stored procedure source, the second sensitive data pattern being associated with a higher sensitivity score than the first sensitive data pattern; and assigning the sensitivity score based on the second sensitive data pattern. This hierarchy of sensitivity ensures that when confronted with multiple vulnerabilities or threats, the system prioritizes the most severe or dangerous, optimizing resource allocation and enhancing the speed of response.

In an embodiment, comparing the first sensitivity score and the second sensitivity score includes computing a difference between the first sensitivity score and the second sensitivity score; and identifying a potential malicious activity responsive to a determination that the difference exceeds a predetermined threshold. An advantage here is the system's capability to quantify threat levels, providing an objective measure of risk. This quantification allows for systematic risk assessment, setting up automated responses, or alerts when certain thresholds are breached.

An embodiment also includes determining to allow the response to the stored procedure call to the client responsive to a determination that there is no potential malicious activity. This adds a responsive mechanism that ensures that genuine, non-malicious requests are not hampered or delayed, thus maintaining system efficiency and user experience.

An embodiment also includes generating an alert responsive to a determination that there is potential malicious activity. The proactive alert system ensures that any threats are immediately flagged, allowing swift remediation and ensuring that stakeholders remain informed about the system's state.

An embodiment also includes determining, responsive to receiving a second stored procedure call by the client for a second stored procedure, whether the second stored procedure has been assigned a first sensitivity score via the discovery process; and determining to block a response to the second stored procedure call responsive to a determination that the second stored procedure has not been assigned the first sensitivity score via the discovery process. This reactive measure fortifies the system against unforeseen vulnerabilities that might be exploited in newer procedures, effectively future-proofing the security mechanism.

An embodiment also includes determining whether the second stored procedure has been assigned a second sensitivity score responsive to receiving the second stored procedure call by the client; and generating an alert responsive to a determination that the second stored procedure has not been assigned the second sensitivity score responsive to receiving the second stored procedure call by the client. By generating alerts in the absence of such assignments, the system ensures consistent security protocols across all procedures, ensuring no procedure remains unchecked.

The series of embodiments described collaboratively shape a comprehensive, adaptable, and resilient security infrastructure for managing stored procedures in databases. The layered approach, starting from granular source-level inspection to high-level sensitivity comparisons, ensures a wide net is cast, capturing a broad spectrum of potential vulnerabilities. This robust system not only safeguards against current threats but is also equipped to evolve with emerging risks, assuring long-term security integrity.

In an embodiment, the searching for the sensitive data pattern includes applying a machine learning model, and the sensitivity score assignment recognizes multiple sensitive data patterns with hierarchy, assigning the maximum sensitivity score to the stored procedure call. This embodiment may have the technical effect of ensuring comprehensive coverage against evolving threats. The whole combination enhances security infrastructure by utilizing adaptive search methods like machine learning models which can recognize and adapt to novel patterns. The hierarchical approach to recognizing multiple sensitive data patterns ensures the system addresses the most severe threats first, optimizing resource allocation.

For example, consider a dynamic e-commerce platform that continually updates its database structures and stored procedures in response to evolving market trends. Here, vulnerabilities could emerge unpredictably. The system, by using machine learning models, adapts and learns from the vast amounts of data it processes, recognizing new threat patterns. If a stored procedure exhibits multiple vulnerabilities, the system prioritizes fixing the most severe one, ensuring maximum security. This keeps the platform secure even amidst frequent changes, providing a safe shopping environment for its users.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
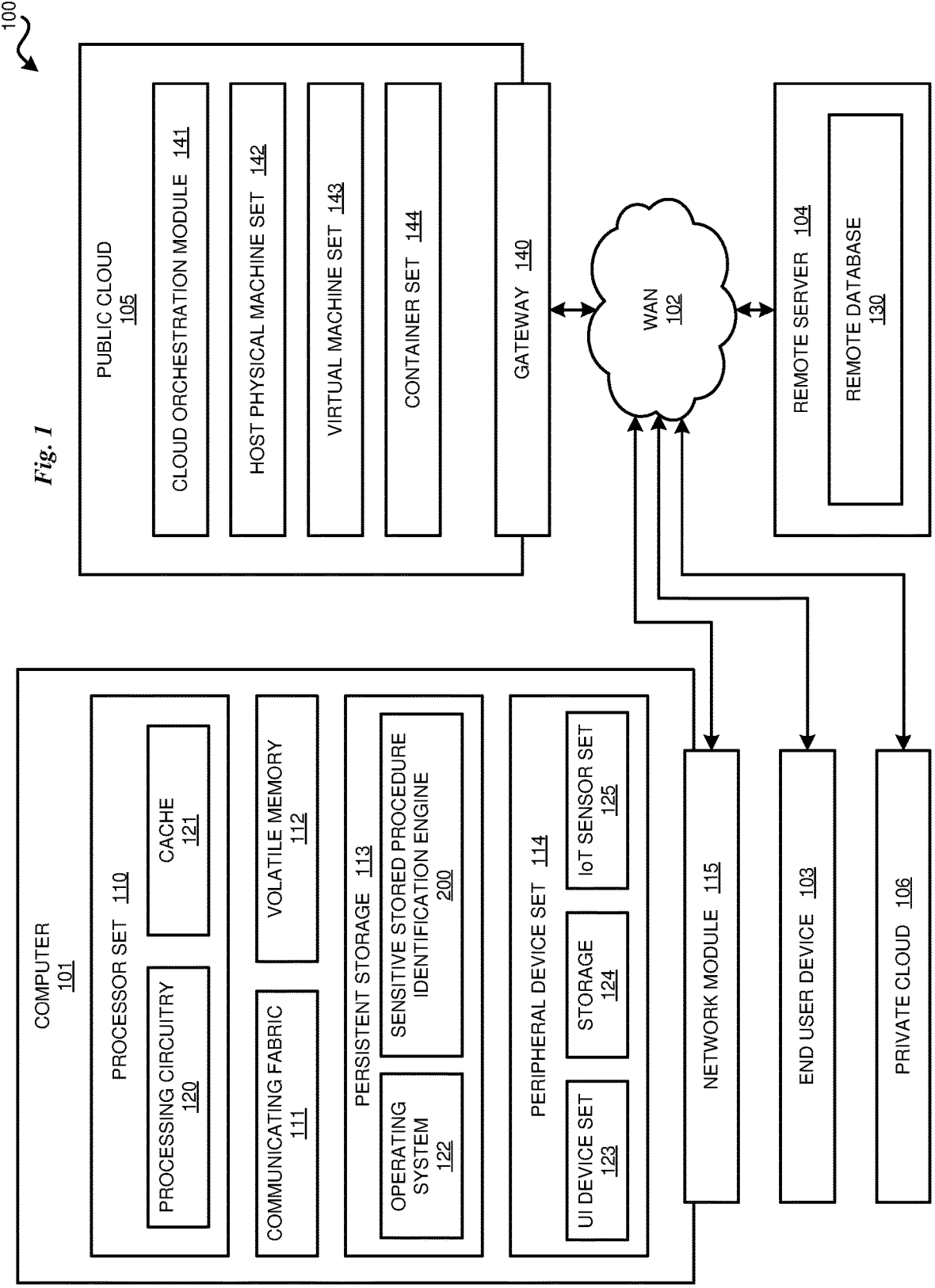
FIG. 1 depicts a block diagram of a computing environment in accordance with an illustrative embodiment.

Stored procedures are sets of commands stored inside a database. These commands can be executed to perform specific operations or functions within the database. Unlike ordinary queries, stored procedures are precompiled. This pre-compilation helps in speeding up the execution, thereby improving the overall performance of database interactions. By accepting input parameters, stored procedures allow for a great deal of flexibility. The same procedure can be used for various tasks across different applications or users by simply changing the input data. This adaptability makes stored procedures an efficient and versatile tool in managing data and streamlining operations within a database.

The use of stored procedures often enhances network efficiency. When complex operations need to be performed on data, executing a stored procedure directly on the database server avoids the need to send large amounts of data across the network. This helps in reducing network traffic, allowing for more streamlined communication between the database and client applications. The encapsulation of operations within stored procedures, however, has its challenges in terms of security. Since applications and users interact with stored procedures by calling their names and do not see the underlying commands, it becomes difficult for external security systems to monitor these operations. While some database systems offer built-in monitoring features, they might not always provide a sufficient level of security, especially if an unauthorized user gains administrative access to the database. This complexity in monitoring and potential vulnerability highlights the importance of considering security when implementing and managing stored procedures.

Stored procedures present a specific set of challenges when it comes to monitoring and security. The encapsulation of underlying commands within stored procedures running on database servers means that traditional monitoring methods may not have visibility into what is being executed. This lack of transparency can create security blind spots where malicious activities, such as unauthorized data access or manipulation, may go undetected. Additionally, traditional systems that rely on continuous monitoring of raw queries might not be equipped to handle the unique nature of stored procedures, leading to inefficiencies and vulnerabilities.

Existing methods involve statically mapping stored procedures to their underlying queries, which involves a discovery process where stored procedures are linked to the queries they run, but this is not a foolproof solution. The discovery process does not run continuously in real time, which creates gaps in security monitoring. Attackers can exploit these gaps to modify or delete stored procedures and access sensitive data without detection. Furthermore, the mapping of stored procedures with their queries risks exposing the logic of the source code outside the database server, a situation that may be unacceptable for both proprietary and security reasons.

The present disclosure addresses the deficiencies described above by providing a process (as well as a system, method, machine-readable medium, etc.) that provides for sensitive stored procedure identification without data exposure. The process may involve delegating the preliminary evaluation of existing stored procedures to a periodically running discovery process on the database server without exposing sensitive information, identifying client calls to stored procedures in real-time transactions, maintaining a set of sensitive data patterns with predefined sensitivity scores, and applying specific security rules to stored procedure requests. These rules may govern the passage, alerting, or blocking of a stored procedure request based on the comparison and evaluation of sensitivity scores assigned to the stored procedures, thus achieving external-to-database security evaluation in real time without exposing sensitive information outside of the database service.

Illustrative embodiments provide for use of a sensitive stored procedure identification engine. A "sensitive stored procedure identification engine," as used herein, may refer to a specialized system or module that aids in detecting and evaluating the sensitivity of stored procedures without data exposure. This engine may integrate with database services, leveraging regular expression searches, machine learning techniques, and other techniques, to analyze data. For example, this engine might work by monitoring the interactions between client applications and a database. It may track real-time queries, their metadata, and the subsequent data responses.

Illustrative embodiments provide for initiating a discovery process. A "discovery process," as used herein, may refer to a systematic approach of scanning and identifying stored procedures, evaluating them against set criteria, and categorizing them based on their sensitivity or risk levels. This process may utilize a combination of static analysis, which evaluates the stored procedure code, and dynamic analysis, which monitors its runtime behavior. For example, during the discovery phase, a tool or algorithm may crawl through all stored procedures in the database, extracting its source data and assigning a sensitivity score to it. If a procedure interacts with a table storing medical records, for example, its sensitivity might be categorized using a high sensitivity score. The discovery process can be adaptive, being periodically initiated (e.g., once a day, once a week), or dynamically initiated based on specific triggers. Triggers could range from system updates, the addition of new stored procedures, or external factors like changes in data protection regulations.

In some embodiments, the discovery process may be performed on a database server. A "database server," as used herein, may refer to a dedicated computing system designed to host a database, manage database operations, and facilitate interactions with stored data. It might be a structured query language (SQL) server or a not-only-SQL (NoSQL) server, for instance, that processes requests, manages stored procedures, and ensures data security and integrity. For instance, an SQL server might utilize indexing, caching, and parallel processing to enhance the speed and efficiency of stored procedures. When the discovery process runs on such a server, it may help ensure comprehensive analysis while maintaining optimal server performance.

In some embodiments, the discovery process may be used to identify a stored procedure. A "stored procedure," as used herein, may refer to a pre-defined set of instructions or commands stored in the database, which can be executed to achieve specific tasks or data manipulations without having to be written multiple times. It may refer, for instance, to a set of SQL statements with an assigned name, stored in the database catalog. It may allow users to encapsulate complex operations, ensuring consistency, reusability, and efficiency. For example, in an e-commerce system, a stored procedure might be employed to process user checkouts. It can calculate total prices, applying discounts, adding taxes, or checking inventory levels, ensuring a seamless checkout experience for users.

Moreover, in some embodiments, the discovery process may be used to assign a first sensitivity score to a stored procedure. A "sensitivity score," as used herein, may refer to a numerical or categorical value indicating the risk or sensitivity associated with a specific stored procedure, based on the nature of data it interacts with or the operations it performs. For example, a stored procedure interacting with user's credit card details might have a higher sensitivity score compared to one fetching publicly available product details. Over time, these scores may be calibrated with real-world feedback, ensuring their relevance and accuracy.

Assigning a sensitivity score may involve one or more algorithmic evaluations, like analyzing the content of the stored procedure, assessing the security measures in place (e.g., encryption, access controls), and understanding its data access patterns. It may involve, for instance, analyzing the content, operations, and sensitivity data patterns of the stored procedure, and comparing it with a set of predefined criteria or learned patterns. The process could use a combination of machine learning algorithms, deterministic rules, and heuristic analysis to determine the sensitivity score of each stored procedure based on its functionalities and data interactions. For example, the process might use machine learning algorithms to predict sensitivity based on past evaluations. Deterministic rules could assess if certain explicit data types (like social security numbers or medical records) are accessed. Heuristic analysis could evaluate patterns, identifying potential risks even if they do not match known threats.

For example, a machine learning model may be applied for identifying sensitive patterns within stored procedures, which may be configured to scan and/or evaluate these procedures to classify their sensitivity. To train such a model, a training dataset can be constructed containing examples of stored procedures, labeled based on their sensitivity scores. Additionally, the dataset may be enriched with examples of common sensitive patterns such as regular expressions for credit card numbers, social security numbers, or medical records. Using supervised learning algorithms like decision trees, support vector machines, or deep neural networks, the model can be trained on this dataset to discern the relationship between the features of the stored procedures and their sensitivity labels. The model be further fine-tuned or retrained using newer data or user feedback, ensuring its efficacy remains high as the nature of stored procedures and data sensitivity norms evolve over time.

Illustrative embodiments provide for assigning a second sensitivity score to a stored procedure. In some embodiments, this assignment may be performed during a real-time analysis, such as responsive to receiving a stored procedure call. A "stored procedure call," as used herein, may refer to a request made by a client application or system to execute a specific stored procedure within a database. For example, a banking application might send a stored procedure call to fetch transaction details for a given user within a specific time frame. This call may be sent, for instance, using a database query language like SQL. In the banking application's interface, a user might request to view their transaction history. Behind the scenes, this action might trigger a stored procedure call like "EXEC FetchUserTransactions @UserID," which may be designed to retrieve all transactions related to the specified user ID from the database.

Illustrative embodiments provide for comparing the first and second sensitivity scores. This comparison may involve assessing the difference, or variance, between the initial score (assigned during the discovery process) and the second score (assigned in real-time). This comparative analysis may be used to discern any variance in perceived data sensitivity. Additionally, it may use algorithms that factor in other information, such as the database's contents, historical access patterns, prevailing threat vectors, among other data. Differences might hint at changes in the stored procedure's data access or potential external threats, which may be used to determine if there are deviations in sensitivity or potential oversights. Statistical methods, machine learning algorithms, or fuzzy logic, among other methods, might be used to discern discrepancies and to interpret their significance based on various factors, such as user behavior, context, and historical trends. For instance, machine learning models could be employed to analyze sensitivity data patterns and the nature of the data accessed, and any other anomalous behaviors, using these factors to generate or adjust the sensitivity score.

Illustrative embodiments provide for taking an action based on the comparison of the first and second sensitivity scores. An "action," as used herein, may refer to a measure or step undertaken by the security system in response to the perceived sensitivity or risk, such as allowing, modifying, or blocking a request, or triggering alerts. This could encompass a wide range of reactions, from benign notifications to the outright rejection of suspicious requests. The system might, for instance, block a particularly sensitive request, redact certain parts of the data, or notify system administrators of potential security concerns. For example, if a stored procedure that usually accesses non-sensitive inventory data suddenly starts querying customer personally identifiable information, the system might restrict data output, flag the anomaly, or temporarily lock down certain database sections pending a security review.

In some embodiments, for example, an action may include allowing or blocking a response to the stored procedure call to the client based on the comparison. A "response," as used herein, may refer to the output or result set produced by executing the stored procedure, which may be intended to be sent back to the requesting client. For example, in a retail system, a response might include the list of items a user has in their shopping cart, combined with pricing and availability details. This could be accompanied by recommendations, individual item prices, and perhaps user reviews, all collated and returned as a structured JavaScript Object Notation (JSON) object.

As another example, an action may involve generating an alert. An "alert," as used herein, may refer to a notification or warning signal generated by a system in response to anomalous, suspicious, or non-compliant behavior. The alert may be designed to draw immediate attention to potential threats, breaches, or irregularities, enabling timely intervention or investigation. These notifications can be generated in various formats, such as on-screen pop-ups, emails, short message service (SMS) messages, or logs, and may contain details about the event, the data or system involved, timestamp, and recommended actions, or any other desired information. Generating an alert may involve notifying stakeholders or administrators about potential security threats, discrepancies, or policy violations detected during the analysis. An alert might be sent to the security team, for instance, if a stored procedure call attempts to access highly sensitive data where the stored procedure typically accesses benign non-sensitive data, suggesting a possible security breach. For example, an anomaly may occur when the typically benign "FetchEmployeeBasicDetails" procedure unexpectedly retrieves sensitive data, including an employee's social security number and bank account details. The security system may promptly generate an alert, notifying the cybersecurity team of this irregular behavior for immediate investigation.

Illustrative embodiments provide for identifying a stored procedure source associated with the stored procedure. A "stored procedure source," as used herein, may refer to the original code or script that defines the operations and logic of the stored procedure within a database system. This source may encapsulate the logic and specifics of data operations, acting as a reusable script. In a SQL-based database, for instance, the stored procedure source could be a set of SQL commands that fetch and manipulate data based on input parameters. For example, it might consist of a sequence that inserts data into a customer table while simultaneously updating an audit log. Identifying a stored procedure source may involve parsing the database metadata, querying system catalogs, or using database management tools to extract the code associated with a specific stored procedure.

Illustrative embodiments provide for searching for a sensitive data pattern in a stored procedure source. A "sensitive data pattern," as used herein, may refer to specific strings, formats, or sequences that indicate the presence of sensitive information like credit card numbers, social security numbers, or personally identifiable information. For example, a pattern such as "XXX-XX-XXXX" might be indicative of a social security number in the United States. Searching for a sensitive data pattern may involve scanning the stored procedure source line-by-line, evaluating each segment against a library of known sensitive data formats. For example, an algorithm might check each line of the source for patterns that match common formats of credit card numbers.

In some embodiments, for instance, searching for the sensitive data pattern may involve using methods such as regular expressions, wildcard searches, and machine learning models. Using regular expressions may involve pattern matching techniques that can detect specific sequences or formats in text. For example, the regular expression $\textasciicircum\d\{3\}-\d\{2\}-\d\{4\}\$$ might be used to detect the aforementioned social security pattern. Using a wildcard search may involve searching for known sensitive data indicators with placeholders, allowing for variations in the actual data. For example, a wildcard search might look for any ten-digit sequence starting with "9" to potentially detect certain types of identification numbers. Applying a machine learning model may involve utilizing pre-trained models that have learned from historical data to identify potentially sensitive patterns in new data. For example, a machine learning model might have been trained on several stored procedures, learning to flag sequences that typically denote personal identifying information.

Illustrative embodiments provide for assigning a sensitivity score based on an identified sensitive data pattern. This process may involve weighing various factors such as the type of sensitive data, its context, and its relevance to the system. For example, a credit card number might receive a higher sensitivity score compared to an email address. In some embodiments, these sensitivity scores may be preset by a user, based on the particular use or application. For example, email addresses might be assigned a value of "1," indicating a low sensitivity, while social security numbers may be assigned a value of "3," indicating a high sensitivity.

In some embodiments, assigning a sensitive score may involve assigning the maximum sensitivity score from among a plurality of sensitive scores associated with identified sensitive data patterns. For example, the system may identify a first sensitive data pattern in the stored procedure source, identify a second sensitive data pattern with a higher sensitivity score, and assigning the sensitivity score based on the second sensitive data pattern. This process may involve analyzing all detected patterns, comparing their respective scores, and choosing the highest among them. For example, if a stored procedure source contains both an email address and a social security number, and the latter has a higher sensitivity score, the system might assign the stored procedure the score associated with the social security number.

Illustrative embodiments provide for extracting object names from a stored procedure source. An "object," as used herein, may refer to a manageable entity within the database system. Objects can be tangible entities like tables, views, indexes, and constraints, or they can be routines like functions, stored procedures, or triggers. For instance, a table object may hold customer data, while a trigger object may execute specific actions upon certain conditions in a database table. These objects, by virtue of their roles and interactions within the system, can potentially come into contact with sensitive data. An "object name," as used herein, may refer to specific identifiers or references to an object. Object names can be extracted from a stored procedure source through a combination of syntactic and semantic parsing. Initially, the system may employ lexical analysis to tokenize the stored procedure source. Following this, a parser can identify specific tokens or sequences corresponding to object references. For SQL-based databases, for example, patterns such as "FROM [TableName]" or "JOIN [TableName]" in SQL statements can indicate table object interactions. Additionally, system catalog tables or metadata tables can be queried to validate and enrich the extracted object names, ensuring comprehensiveness in the extraction process. Extracting these object names may provide a clearer understanding of which components of the database the stored procedure interacts with, enabling a more accurate sensitivity assessment.

Illustrative embodiments provide for searching a plurality of collections associated with a plurality of object names for a sensitive data pattern, and assigning a sensitivity score based on the searching of the sensitive data pattern. A "collection," as used herein, may refer to a set of data or entities that are either directly associated with a database object or provide auxiliary information to it. Collections, for instance, can be datasets that feed into a database object, configurations that dictate how an object behaves, logs that track interactions, or meta-data that provides additional context. For example, if an object is a "Customer" table, then associated collections might include datasets of address data, related transaction logs, configurations defining data validation rules, and meta-data outlining table relationships. Searching collections may involve a systematic approach that takes into account the type and structure of each collection. For datasets, structured query language (SQL) or equivalent querying mechanisms can be employed to scan for sensitive patterns. For configurations, logs, and meta-data, text-based search algorithms, regular expressions, or even machine learning models trained to recognize sensitive data formats may be utilized. When working with collections that are vast or regularly updated, indexing mechanisms might be implemented to speed up the search process. This approach may help ensure that any sensitive data pattern, whether in structured datasets or auxiliary text data, is effectively identified. This assignment of the sensitivity score, after searching the sensitive data pattern, may help take into account not just the direct interactions of the stored procedure but also the indirect interactions through associated collections. This multi-layered approach may help ensure a comprehensive assessment, ensuring that even oblique interactions with sensitive data are considered in the overall sensitivity scoring.

Illustrative embodiments provide for comparing the first and second sensitivity scores by computing a difference and identifying potential malicious activity if this difference exceeds a predetermined threshold. A "potential malicious activity," as used herein, may refer to any suspicious or unauthorized actions that may indicate attempts to compromise the database, misuse sensitive information, or perform activities outside the normal operational scope of a user or system. For example, a series of rapid-fire stored procedure calls with varying sensitivity scores, or a sudden spike in high-sensitivity stored procedure calls from a previously low-activity user, may be indicative of such malicious activities.

Computing a difference between sensitivity scores may involve subtracting one score from the other to obtain an absolute value, which represents the variance between the anticipated sensitivity and the actual sensitivity of the stored procedure call. For example, if a stored procedure is expected to have a sensitivity score of 10 (on a scale of 1 to 100) but receives a score of 75 when called, the difference would be 65. Any other scale may be used, however, as would be appreciated by those having ordinary skill in the art upon reviewing the present disclosure. The predetermined threshold may be selected based on risk assessments, historical data, or database administrator preferences that determine the acceptable variance in sensitivity scores before flagging potential issues. For example, a threshold may be set at a difference of 25 points, meaning any variance greater than this would trigger potential malicious activity detection.

In some embodiments, determining to allow the response to the stored procedure call may be based on whether there is no potential malicious activity. If the computed difference is below the threshold, the system might proceed without any alerts or blocks. For example, if the variance is 10 points and the threshold is set at 25, the procedure call would be considered safe. Similarly, in some embodiments, generating an alert may be based on whether there is potential malicious activity. If the difference in scores surpasses the threshold, it might prompt the system to alert administrators or take other predefined security measures. For example, a real-time dashboard might flash a warning or send an email to database administrators when suspicious activity is detected.

Illustrative embodiments provide for determining, when receiving a call for a second stored procedure, if that procedure has been assigned a first sensitivity score and deciding whether to block a response based on that determination. This process may involve checking a registry or list of procedures with associated sensitivity scores, then comparing the stored procedure in question to that list. For example, if the first sensitivity score is set and the second sensitivity score is not set, then the system may issue a high-level alert or block the request, indicating potential misuse or unanticipated behavior.

Illustrative embodiments provide for determining if the second stored procedure has been assigned a second sensitivity score upon its call by the client and generating an alert if it has not. For instance, if both the first and second sensitivity scores are not set, the system may generate an alert about the new not evaluated stored procedure, prompting administrators to review and potentially update the sensitivity scoring system.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The process software for sensitive stored procedure identification without data exposure is integrated into a client, server and network environment, by providing for the process software to coexist with applications, operating systems and network operating systems software and then installing the process software on the clients and servers in the environment where the process software will function.

The integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

With reference to FIG. 1, this figure depicts a block diagram of a computing environment 100. Computing environment 100 contains an example of an environment for the execution of at least some of the computer code involved in performing the inventive methods, such as sensitive stored procedure identification engine 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
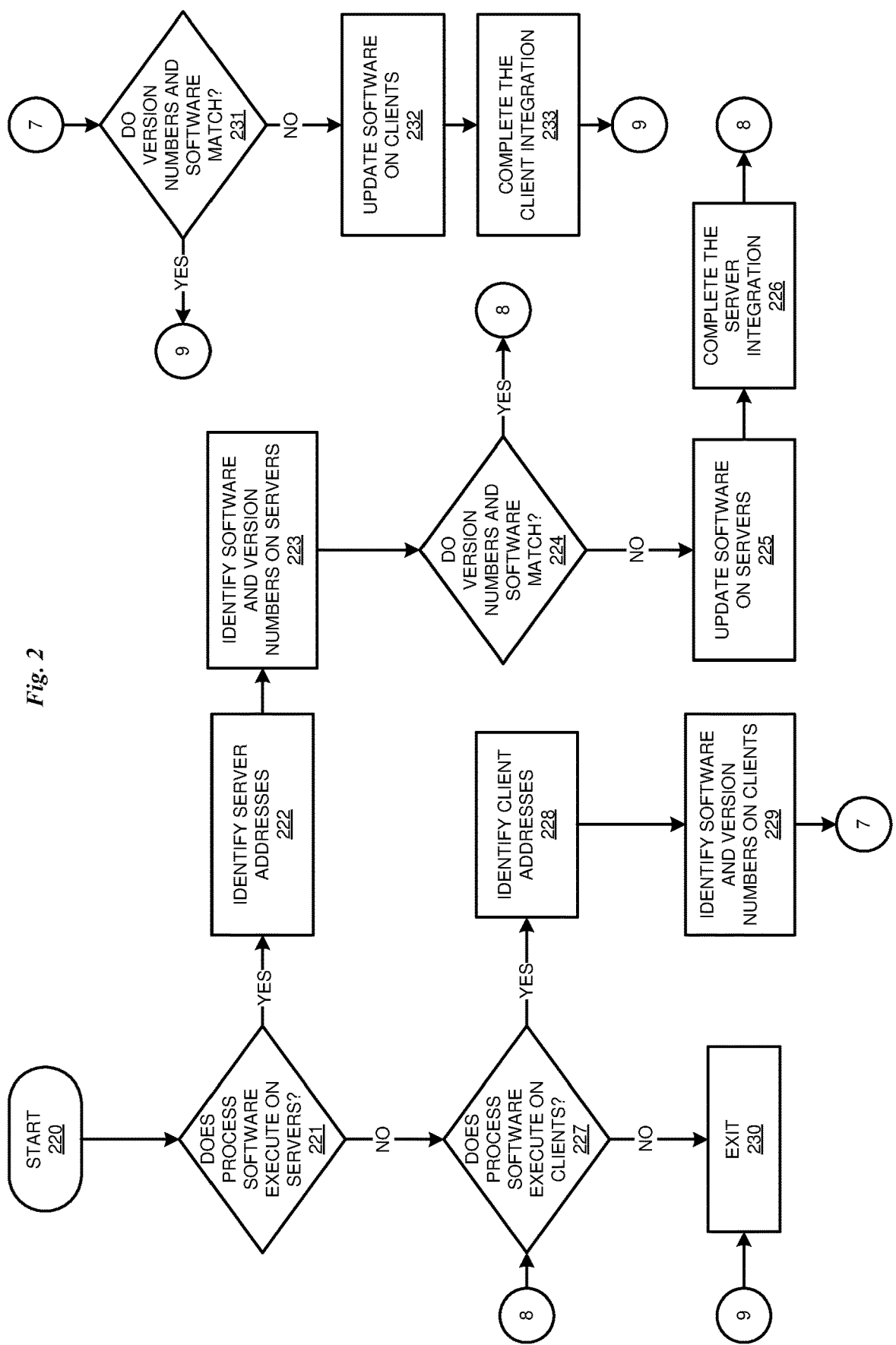
FIG. 2 depicts a block diagram of an example software integration process in accordance with an illustrative embodiment.

With reference to FIG. 2, this figure depicts a block diagram of an example software integration process, which various illustrative embodiments may implement. Step 220 begins the integration of the process software. An initial step is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications, and NOS that have been tested with the process software (224). If all of the versions match and there is no missing required software, the integration continues (227).

If one or more of the version numbers do not match, then the unmatched versions are updated on the server or servers with the correct versions (225). Additionally, if there is missing required software, then it is updated on the server or servers (225). The server integration is completed by installing the process software (226).

Step 227 (which follows 221, 224 or 226) determines if there are any programs of the process software that will execute on the clients. If no process software programs execute on the clients, the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made if the version numbers match the version numbers of OS, applications, and NOS that have been tested with the process software (231). If all of the versions match and there is no missing required software, then the integration proceeds to 230 and exits.

If one or more of the version numbers do not match, then the unmatched versions are updated on the clients with the correct versions 232. In addition, if there is missing required software, then it is updated on the clients 232. The client integration is completed by installing the process software on the clients 233. The integration proceeds to 230 and exits.

Figure 3:
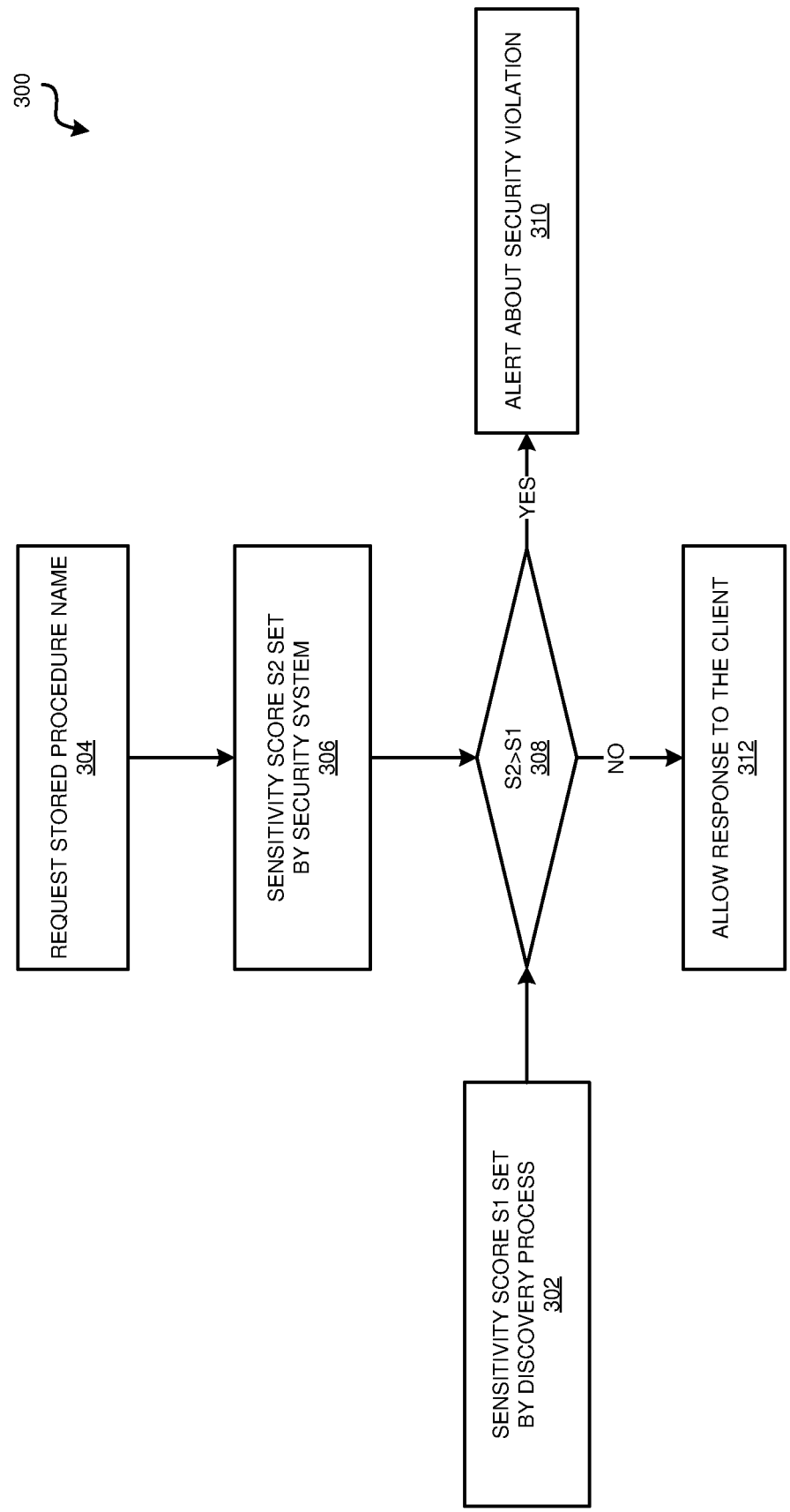
FIG. 3 depicts a block diagram of an example process for sensitive stored procedure identification without data exposure in accordance with an illustrative embodiment.

With reference to FIG. 3, this figure depicts a block diagram of an example process for sensitive stored procedure identification without data exposure in accordance with an illustrative embodiment 300. The example block diagram of FIG. 3 may be implemented using sensitive stored procedure identification engine 200 of FIG. 1.

In the illustrative embodiment, at block 302, the process may set sensitivity score S1 by a periodic discovery process. This process may involve evaluating and assigning a sensitivity level to stored procedures based on predetermined criteria such as the type of data involved, its relevance to the business, legal requirements, or risk assessments, among other factors. For example, the discovery process might scan all stored procedures and identify ones that access customer personal data. It may then assign a high sensitivity score (S1) to these procedures, as they contain information that could be considered highly confidential. The process could take into account various patterns, including regular expressions, wildcard searches, rule-based algorithms, machine learning, or any other suitable process, to identify the sensitivity of the objects associated with stored procedures.

At block 304, the process may receive a request for a stored procedure name. This process may involve retrieving the name or identifier of the specific stored procedure being executed or analyzed. For example, a database client may request the execution of a stored procedure to fetch user profiles. The process could then extract the specific name of the procedure for further analysis or logging.

At block 306, the process may set sensitivity score S2 by the security process. This process may involve real-time evaluation of the executed stored procedure to determine its current sensitivity score. This may be based on live data analysis, looking for patterns or behavior indicative of sensitive or risky information being accessed or manipulated, in the same or similar manner as described above in connection with the discovery process of block 302. For example, the security process may monitor the actual data being accessed by the stored procedure, identifying sensitive patterns like credit card numbers or health records. If such patterns are found, a higher sensitivity score S2 may be assigned, reflecting the increased risk.

At block 308, the process may determine whether S2 is greater than S1. This process may involve comparing the real-time sensitivity score (S2) determined by the security process with the initial sensitivity score (S1) assigned by the discovery process. This process may serve to detect discrepancies or changes in sensitivity that could indicate unauthorized or malicious behavior. For example, if S1 was initially set to a low score, but the real-time analysis reveals access to highly sensitive data (resulting in a high S2), this comparison would identify the discrepancy, flagging potential misuse of the stored procedure.

At block 310, if S2 is greater than S1, the process may alert about the security violation. This process may involve generating a security alert or notification to administrators or security teams, logging the incident, or triggering automated security responses such as blocking the request or initiating further investigations. For example, if the comparison reveals unauthorized access to sensitive data, an alert could be sent to the security operations center, initiating an immediate investigation into potential data leakage or other security violations.

At block 312, if S2 is not greater than S1, the process may allow a response to the client. This signifies that the executed stored procedure is operating within expected parameters and no unusual sensitivity has been detected. It may involve forwarding the result of the stored procedure to the client, logging the successful execution, or other operational procedures. For example, if a stored procedure to fetch public product details is executed and no sensitive patterns are detected, the result might be sent back to the client, allowing the user to view the product information as requested.

Figure 4:
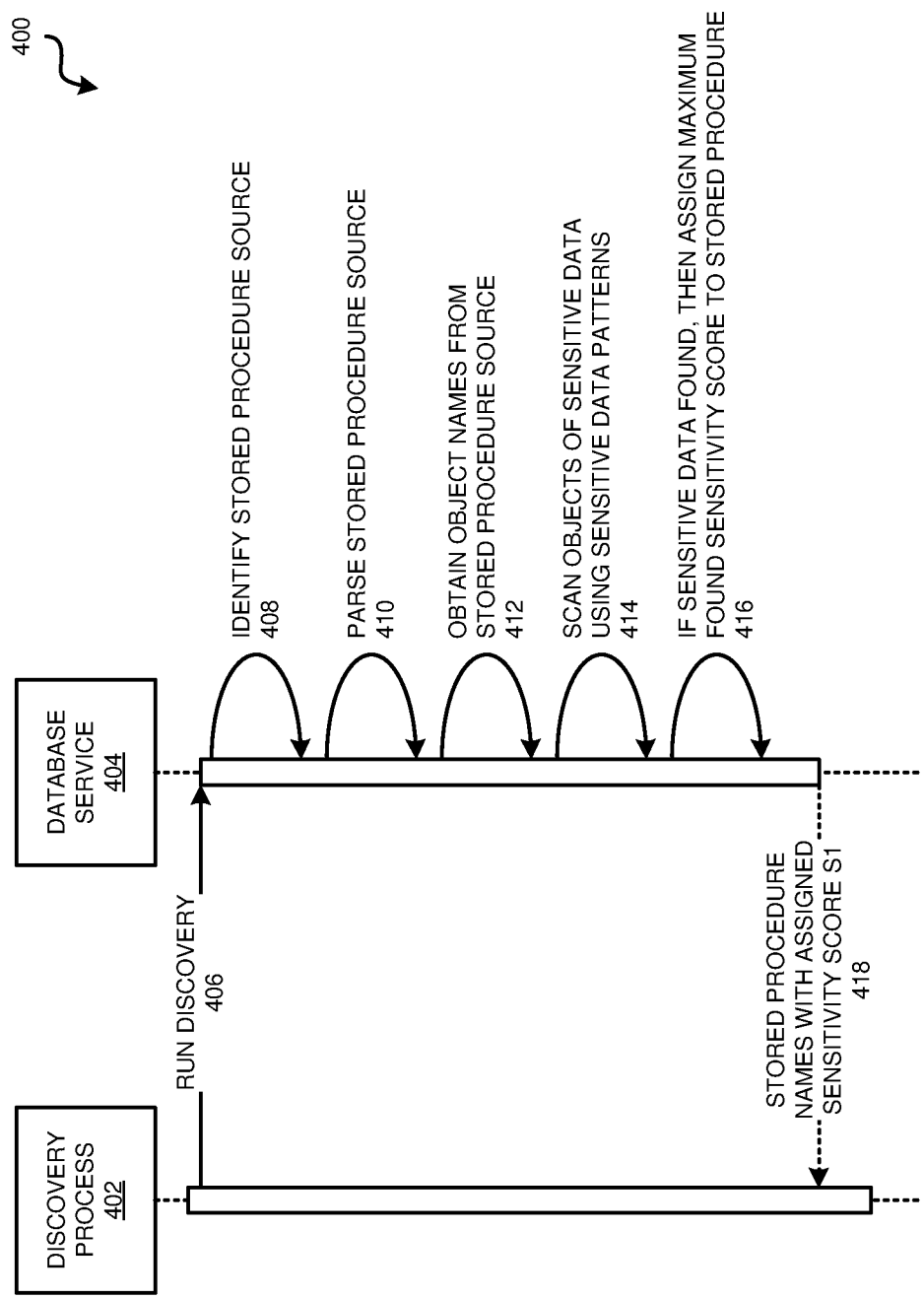
FIG. 4 depicts a block diagram of an example process for setting a sensitivity score by a discovery process in accordance with an illustrative embodiment.

With reference to FIG. 4, this figure depicts a block diagram of an example process for setting a sensitivity score by a discovery process in accordance with an illustrative embodiment 400. The example block diagram of FIG. 4 may be implemented using sensitive stored procedure identification engine 200 of FIG. 1.

In the illustrative embodiment, discovery process 402 may serve as a triggering mechanism within the sensitive stored procedure identification framework operating in a database instance. While it may initiate the sequence of operations for identifying and analyzing stored procedures, the discovery process itself need not directly inspect or parse the code of the stored procedures. Instead, it may delegate the task of analyzing the underlying code and subsequent sensitivity assignment to the database service 404. In doing so, the discovery process may ensure an added layer of abstraction, preserving the confidentiality of the database's content. Once the database service completes its evaluations, it may return its findings, like sensitivity scores, to the discovery process. For example, while the discovery process might prompt the system to examine specific stored procedures, it may rely on pattern-matching techniques executed by the database service—be it regular expressions, wildcard searches, or machine learning algorithms—to scrutinize and classify the content within the database.

Database service 404 may represent the centralized component where stored procedures are stored and managed. Serving as the nexus for database interactions, this service may help in ensuring the efficient storage and retrieval of these precompiled command sets. Ensuring that these procedures are housed within a singular, centralized framework may help guarantee consistent accessibility and streamline their integration with the broader system components, such as the discovery process.

At block 406, the discovery process may run discovery, which may involve a systematic examination of stored procedures to identify references of sensitive objects within the extracted object list. This process might include correlating sensitive objects with specific stored procedures, subsequently marking them as sensitive and adding their names and maximum found sensitivity scores to the group of sensitive stored procedures. For example, if a stored procedure accesses a table containing credit card numbers, it might be marked with a high sensitivity score.

At block 408, the database service may identify a stored procedure source, extracting the specific logic and commands associated with that stored procedure in the database. This process may aim to retrieve the raw source code of stored procedures, serving as a foundation for subsequent parsing, analysis, and security monitoring. The extraction of the source could be done without compromising the confidentiality of the database's content. For instance, by obtaining the actual source code of stored procedures, the database service may ensure comprehensive visibility into each procedure's functionality and potential data access patterns. This process might use cryptographic or secure access methods to ensure that stored procedure sources are extracted in a secure and trusted manner. Furthermore, having access to the raw stored procedure source may be used for the identification and classification of procedures based on their potential sensitivity.

At block 410, the database service may parse the stored procedure source, analyzing the underlying code and logic of stored procedures. This process might involve breaking down the stored procedures into smaller components to identify relationships and references to sensitive objects. This process might unravel complex nested procedures or queries, revealing hidden connections to sensitive data.

At block 412, the database service may obtain object names from the stored procedure source, involving the extraction of specific object names referenced within stored procedures. This process could help in mapping stored procedures to their underlying queries, tables, and views, thereby building a comprehensive object dependency graph.

At block 414, the database service may scan objects of sensitive data using sensitive data patterns. This process could involve applying specific pattern-matching techniques to locate sensitive data within the object structures, such as personal data or financial information. For example, this may include utilizing machine learning algorithms to detect patterns of sensitive data.

At block 416, the database service may, if sensitive data is found, assign the maximum found sensitivity score to stored procedures. This process might involve a systematic evaluation of sensitivity scores and determining the most critical score applicable to each stored procedure. It might focus on assigning scores that represent the highest level of sensitivity detected within each stored procedure. For example, if multiple types of sensitive data are accessed, like social security numbers and medical records, the highest applicable score might be assigned to reflect the highest level of risk.

At block 418, the database service may return the identified stored procedure's name paired with its designated sensitivity score, S1, to the discovery process. This approach may help prevent data exposure. Instead of transmitting the stored procedure's raw source code, for instance, which might risk revealing the intimate details of its operation, the process may merely communicates its name and associated sensitivity score, S1. This score, in essence, may provide a condensed, abstracted representation of the stored procedure's potential risk level without disclosing its actual content. Subsequently, the S1 score may be used in later processes. As other components or security mechanisms might analyze stored procedures in real-time, they can produce their own sensitivity scores, like S2. By comparing S1 against these real-time scores, the system can efficiently discern any anomalies or discrepancies that might suggest unauthorized or malicious activity. If, for instance, a stored procedure originally marked with a low sensitivity score suddenly engages with high-risk data in real-time, this disparity may become a red flag, highlighting potential misuse or compromise of that stored procedure.

Figure 5:
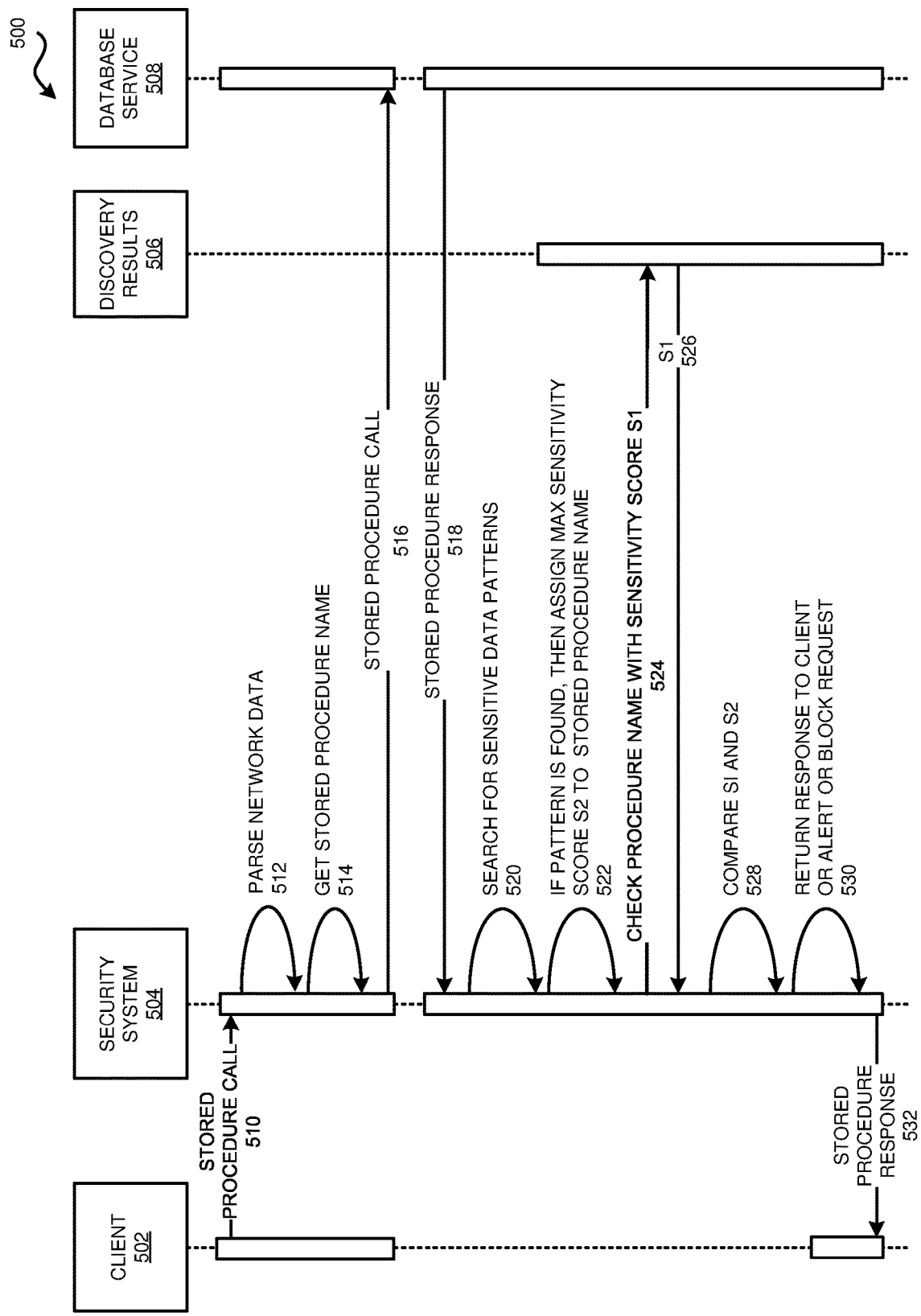
FIG. 5 depicts a block diagram of an example process for sensitive stored procedure identification without data exposure in accordance with an illustrative embodiment.

With reference to FIG. 5, this figure depicts a block diagram of an example process for sensitive stored procedure identification without data exposure in accordance with an illustrative embodiment 500. The example block diagram of FIG. 5 may be implemented using sensitive stored procedure identification engine 200 of FIG. 1.

In the illustrative embodiment, client 502 may represent a user interface or an application interacting with the database. This client could be anything from a web application, mobile application, or an internal system that requires access to stored procedures within the database. This client may be equipped with the capability to make procedure calls and receive responses, facilitating user interaction with data stored within the database. For example, a client could be a banking application that calls stored procedures to retrieve a user's transaction history, communication with the database could occur via application programming interfaces (APIs), using protocols like representational state transfer (REST) or simple object access protocol (SOAP), and might include additional security measures such as authentication.

Security system 504 may represent the protection mechanism monitoring interactions between the client and the database. This system could include functionalities like network traffic analysis, pattern recognition, and threat detection. It might incorporate machine learning, heuristic analysis, or deterministic algorithms, among others, to identify suspicious or unauthorized activities. It might encompass a set of firewalls, intrusion detection systems (IDS), intrusion prevention systems (IPS), and threat intelligence feeds. It could utilize technologies like SIEM (Security Information and Event Management) for real-time analysis of security alerts generated by the monitored applications. For example, the system might employ a combination of machine learning algorithms and deterministic rules to analyze network traffic, recognize known sensitive data patterns, and respond with predefined actions such as alerting or blocking the suspicious request.

Discovery results 506 may represent the aggregated findings from the discovery process of stored procedures. It could include details such as the names of stored procedures and their associated sensitivity scores, which may be stored as a key-value pair. Other information may be part of the discovery results, however, depending on the particular application or use. The discovery results might include a structured data file, such as a JSON or extensible markup language (XML), which may contain metadata like stored procedure names and sensitivity scores, and perhaps hashes for integrity checks. For example, during the discovery phase, an automated scanning tool could crawl through all stored procedures, evaluating them against a set of predefined rules or heuristic algorithms, classifying them into sensitivity levels. This information might then be stored in an encrypted database, accessible only to authorized security applications.

Database service 508 may represent the specific component that manages and processes stored procedure calls within the database. This service could be responsible for executing, retrieving, and transmitting the data related to stored procedures. For example, it might be an SQL server service that can parse and execute SQL stored procedures, ensuring proper functionality and performance within the database system. It could interpret SQL syntax, execute corresponding logic, and interact with the underlying database engine to read or write data. For example, a complex e-commerce system might use stored procedures to handle checkout processes, involving multiple tables and transaction controls to ensure data integrity. The service may also include caching mechanisms, error handling routines, and performance optimization strategies.

At block 510, the client may execute a stored procedure call. This process may involve crafting and sending a specific query or command to invoke the stored procedure within the database. For example, a client might call a stored procedure to retrieve a customer's account balance, utilizing specific parameters such as the customer's account number. This process may involve crafting a specific SQL query or command, possibly using parameterized queries to prevent SQL injection. As another example, a healthcare application might call a stored procedure to fetch a patient's medical history, passing parameters like patient ID and date range. This call could occur over a secured transport layer security (TLS) connection, ensuring data encryption during transmission.

At block 512, the security system may parse the network data associated with the procedure call. In this phase, the system may employ parsing algorithms to segment the raw network data into component parts. This segmentation may be helpful for further data analysis processes, such as identification of specific query parameters, data payloads, and associated metadata. By accurately extracting components like SQL commands, parameters, and data structures, the system can make informed decisions about the legitimacy and safety of the request.

At block 514, the security system may obtain the stored procedure name from the parsed network data. This process may involve extracting the specific name or identifier from the network data or the query. For example, this might involve regular expression matching or parsing the SQL command to identify the targeted stored procedure, aiding in further analysis. This process might involve regex parsing, lexical analysis, or natural language processing (NLP) to extract the specific identifier. For instance, a smart parser could dissect an SQL command, identifying the stored procedure's name, its parameters, and other syntactical elements, cross-referencing them with known vulnerabilities or security policies.

At block 516, the security system may execute a stored procedure call via the database service. This process could involve forwarding or proxying the client's request to the database, as well as adding monitoring, logging, or security checks. For example, the system might add metadata to the request, allowing downstream security tools to trace its lifecycle, or potentially rewrite the query to include additional safety constraints or optimizations. For example, the security system might add additional logging or monitoring to the call to track its execution.

At block 518, the database service may return a stored procedure response. This process may involve the execution of the stored procedure and the preparation of the corresponding results. It could involve database operations like JOINs, indexing, or parallel processing for performance optimization. The response might be converted into a specific format, such as JSON or XML, and might include additional metadata like timestamps, checksums, or digital signatures for validation. For example, a customer relationship management (CRM) system might utilize stored procedures to fetch customer details, joining multiple tables, applying filters, and returning the result set as a JSON object to the requesting client.

At block 520, the security system may search for sensitive data patterns within the stored procedure response. This process might involve utilizing regular expressions, machine learning models trained on historical data, or heuristic algorithms, among others, designed to recognize patterns indicative of sensitive information like credit card numbers or personally identifiable information. For example, the process might scan the result set, matching patterns against a library of known sensitive data formats, and taking actions like redaction or encryption if a match is found. For example, this process might involve scanning the result set for patterns indicative of sensitive information, like credit card numbers or social security numbers.

At block 522, if a pattern is found, the security system may assign the maximum sensitivity score S2 to the stored procedure name. This process might involve a scoring matrix or rule-based engine, weighing different factors like the type of sensitive data, context, and user behavior. For example, if the detected pattern matches a medical record, a higher sensitivity score might be assigned compared to a less sensitive piece of information like an email address.

At block 524, the security system may check the stored procedure name with the sensitivity score S1 at the discovery results. This process might involve looking up the stored procedure within the previously discovered results and retrieving its initial sensitivity score, such as through a key-value lookup mechanism. This could entail, for instance, querying an internal database or cache where the discovery results are stored. For example, the system might query a secured, access-controlled database containing the discovery results, using a cryptographic hash of the stored procedure name as a key to retrieve the corresponding sensitivity score.

At block 526, the discovery results may return the sensitivity score S1, which may represent the initial sensitivity score assigned during the discovery process. This process may involve retrieving and transmitting the score, possibly involving additional verifications or validations. This process might involve cryptographic operations like digital signing to ensure data integrity or additional validations against contextual data like time, location, or user identity. A checksum or cryptographic signature, for instance, might be used to ensure the integrity of the retrieved score.

At block 528, the security system may compare sensitivity scores S1 and S2, possibly employing statistical methods, machine learning algorithms, or fuzzy logic to assess the difference. It could include analyzing historical trends, contextual factors, or user behaviors. This process might include evaluating whether a discrepancy exists, possibly indicating a change or a previously unidentified sensitivity issue. For example, the system might consider not just the raw scores but also the rate of change, correlation with other security indicators, or alignment with the broader threat landscape, generating a nuanced assessment that informs the next actions.

At block 530, the security system may return a response to the client, or alert, or block the request, based on the comparison between S1 and S2. This process could involve a decision-making engine employing rule-based logic, Bayesian inference, or artificial intelligence-driven predictive analytics. For example, it might involve decision-making logic, taking into account various factors like user permissions, request context, and organizational policies. If a major discrepancy is detected, for instance, the system might block the request and alert the security administrator, potentially triggering an investigation or other security measures. For example, the system might consider factors like the severity of the discrepancy, user's role, current threat level, or compliance requirements, arriving at a decision that balances security, usability, and compliance.

At block 532, the security system may return a stored procedure response, either forwarding the original response or possibly modifying it based on the security analysis, if the process determines to return the response at block 530. This process may involve encryption, logging, or other security-related operations to ensure the integrity and confidentiality of the transmitted data. This could involve, for instance, additional security measures like data encryption using strong cryptographic algorithms, integrity checks, or additional logging for audit purposes. The system might redact sensitive information from the result set or add additional security headers for subsequent processing by the client. For example, the system might encrypt the response using the client's public key, log the transaction with a secure logging server, and forward the encrypted response to the client, ensuring end-to-end security.

Figure 6:
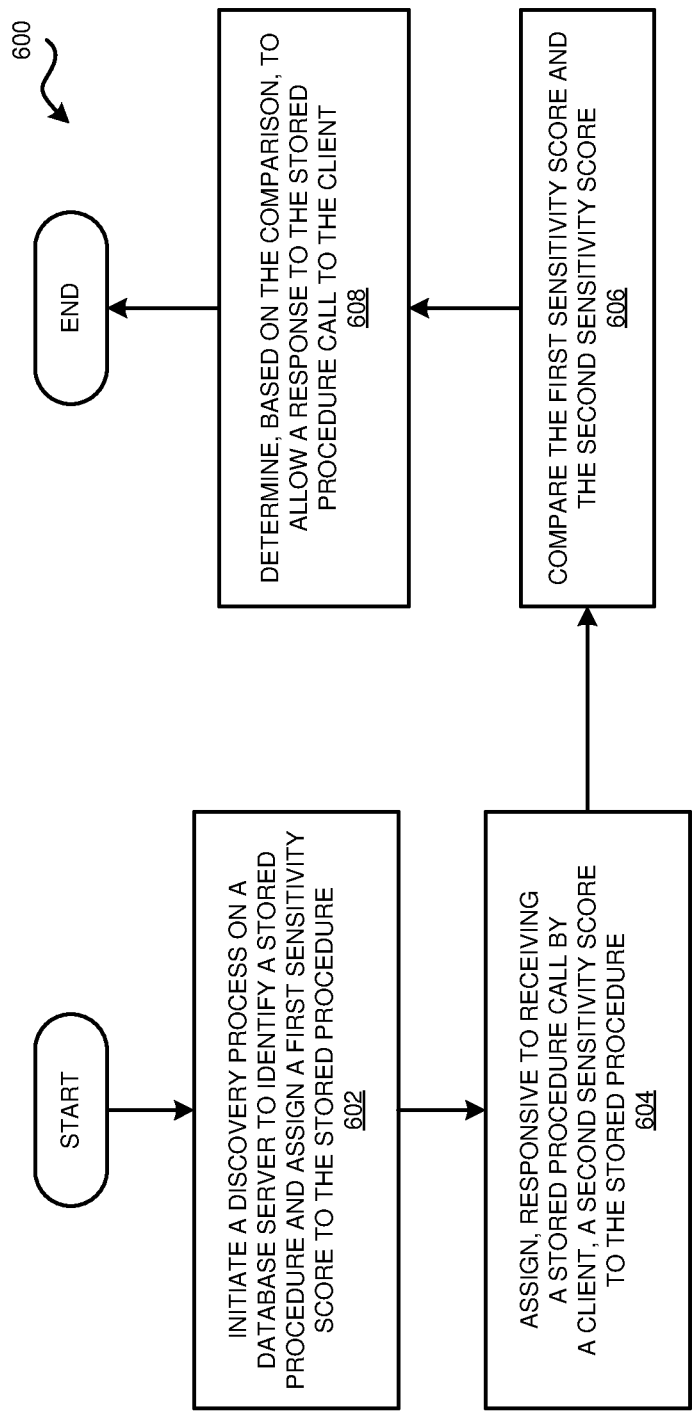
FIG. 6 depicts a block diagram of an example process for sensitive stored procedure identification without data exposure in accordance with an illustrative embodiment.

With reference to FIG. 6, this figure depicts a block diagram of an example process for sensitive stored procedure identification without data exposure in accordance with an illustrative embodiment 600. The example block diagram of FIG. 6 may be implemented using sensitive stored procedure identification engine 200 of FIG. 1.

In the illustrative embodiment, at block 602, the process may initiate a discovery process on a database server. The aim of this process may be to identify a stored procedure and subsequently assign a first sensitivity score to the said stored procedure based on a searching of a sensitive data pattern in the stored procedure. At block 604, upon receiving a stored procedure call by a client, the process may assign a second sensitivity score to the stored procedure based on a searching of the sensitive data pattern in a response to the stored procedure call. At block 606, the process may carry out a comparison between the first sensitivity score and the second sensitivity score. At block 608, based on the comparison, the process may determine whether to allow a response to the stored procedure call made by the client. It is to be understood that steps may be skipped, modified, or repeated in the illustrative embodiment. Moreover, the order of the blocks shown is not intended to require the blocks to be performed in the order shown, or any particular order.

The following definitions and abbreviations are to be used for the interpretation of the claims and the specification. As used herein, the terms "comprises," "comprising." "includes," "including." "has," "having." "contains" or "containing." or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment." "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (Saas) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   initiating, by a sensitive stored procedure identification engine, a periodic discovery process on a database server to identify a stored procedure and assign a first sensitivity score to the stored procedure based on a searching of a sensitive data pattern in the stored procedure;
   assigning in real-time, by the sensitive stored procedure identification engine responsive to receiving a stored procedure call by a client over a network, a second sensitivity score to the stored procedure based on a searching of a sensitive data pattern in a response to the stored procedure call;
   comparing, by the sensitive stored procedure identification engine, the first sensitivity score and the second sensitivity score; and
   determining, by the sensitive stored procedure identification engine based on the comparison, to allow a response to the stored procedure call to the client.

2. The method of claim 1, wherein assigning the first sensitivity score further comprises:
   extracting a plurality of object names from a stored procedure source associated with the stored procedure;
   searching a plurality of collections associated with the plurality of object names for a sensitive data pattern; and
   assigning the first sensitivity score based on the searching of the sensitive data pattern.

3. The method of claim 1, wherein the searching for the sensitive data pattern includes applying at least one of a regular expression, a wildcard search, and a machine learning model.

4. The method of claim 1, wherein assigning the sensitivity score further comprises:
   identifying a first sensitive data pattern in the stored procedure;
   identifying a second sensitive data pattern in the stored procedure, the second sensitive data pattern being associated with a higher sensitivity score than the first sensitive data pattern; and
   assigning the sensitivity score based on the second sensitive data pattern.

5. The method of claim 1, wherein comparing the first sensitivity score and the second sensitivity score further comprises:
   computing a difference between the first sensitivity score and the second sensitivity score; and
   identifying a potential malicious activity responsive to a determination that the difference exceeds a predetermined threshold.

6. The method of claim 5, further comprising:
determining to allow the response to the stored procedure call to the client responsive to a determination that there is no potential malicious activity.

7. The method of claim 5, further comprising:
generating an alert responsive to a determination that there is potential malicious activity.

8. The method of claim 1, further comprising:
determining, responsive to receiving a second stored procedure call by the client for a second stored procedure, whether the second stored procedure has been assigned a first sensitivity score via the discovery process; and
determining to block a response to the second stored procedure call responsive to a determination that the second stored procedure has not been assigned the first sensitivity score via the discovery process.

9. The method of claim 8, further comprising:
determining whether the second stored procedure has been assigned a second sensitivity score responsive to receiving the second stored procedure call by the client; and
generating an alert responsive to a determination that the second stored procedure has not been assigned the second sensitivity score responsive to receiving the second stored procedure call by the client.

10. A computer program product comprising one or more computer readable storage media, and program instructions collectively stored on the one or more computer readable storage media, the program instructions executable by a processor to cause the processor to perform operations comprising:
initiating, by a sensitive stored procedure identification engine, a periodic discovery process on a database server to identify a stored procedure and assign a first sensitivity score to the stored procedure based on a searching of a sensitive data pattern in the stored procedure;
assigning in real-time, by the sensitive stored procedure identification engine responsive to receiving a stored procedure call by a client over a network, a second sensitivity score to the stored procedure based on a searching of a sensitive data pattern in a response to the stored procedure call;
comparing, by the sensitive stored procedure identification engine, the first sensitivity score and the second sensitivity score; and
determining, by the sensitive stored procedure identification engine based on the comparison, to allow a response to the stored procedure call to the client.

11. The computer program product of claim 10, wherein assigning a sensitivity score further comprises:
extracting a plurality of object names from a stored procedure source associated with the stored procedure;
searching a plurality of collections associated with the plurality of object names for a sensitive data pattern; and
assigning the first sensitivity score based on the searching of the sensitive data pattern.

12. The computer program product of claim 10, wherein the searching for the sensitive data pattern includes applying at least one of a regular expression, a wildcard search, and a machine learning model.

13. The computer program product of claim 10, wherein assigning the sensitivity score further comprises:
identifying a first sensitive data pattern in the stored procedure;
identifying a second sensitive data pattern in the stored procedure, the second sensitive data pattern being associated with a higher sensitivity score than the first sensitive data pattern; and
assigning the sensitivity score based on the second sensitive data pattern.

14. The computer program product of claim 10, wherein comparing the first sensitivity score and the second sensitivity score further comprises:
computing a difference between the first sensitivity score and the second sensitivity score; and
identifying a potential malicious activity responsive to a determination that the difference exceeds a predetermined threshold.

15. The computer program product of claim 10, further comprising:
determining, responsive to receiving a second stored procedure call by the client for a second stored procedure, whether the second stored procedure has been assigned a first sensitivity score via the discovery process;
determining to block a response to the second stored procedure call responsive to a determination that the second stored procedure has not been assigned the first sensitivity score via the discovery process;
determining whether the second stored procedure has been assigned a second sensitivity score responsive to receiving the second stored procedure call by the client; and
generating an alert responsive to a determination that the second stored procedure has not been assigned the second sensitivity score responsive to receiving the second stored procedure call by the client.

16. A computer system comprising a processor and one or more computer readable storage media, and program instructions collectively stored on the one or more computer readable storage media, the program instructions executable by the processor to cause the processor to perform operations comprising:
initiating, by a sensitive stored procedure identification engine, a periodic discovery process on a database server to identify a stored procedure and assign a first sensitivity score to the stored procedure based on a searching of a sensitive data pattern in the stored procedure;
assigning in real-time, by the sensitive stored procedure identification engine responsive to receiving a stored procedure call by a client over a network, a second sensitivity score to the stored procedure based on a searching of a sensitive data pattern in a response to the stored procedure call;
comparing, by the sensitive stored procedure identification engine, the first sensitivity score and the second sensitivity score; and
determining, by the sensitive stored procedure identification engine based on the comparison, to allow a response to the stored procedure call to the client.

17. The computer system of claim 16, wherein assigning a sensitivity score further comprises:
extracting a plurality of object names from a stored procedure source associated with the stored procedure;
searching a plurality of collections associated with the plurality of object names for a sensitive data pattern; and
assigning the first sensitivity score based on the searching of the sensitive data pattern.

18. The computer system of claim 16, wherein the searching for the sensitive data pattern includes applying at least one of a regular expression, a wildcard search, and a machine learning model.

19. The computer system of claim 16, wherein assigning the sensitivity score further comprises:
    identifying a first sensitive data pattern in the stored procedure;
    identifying a second sensitive data pattern in the stored procedure, the second sensitive data pattern being associated with a higher sensitivity score than the first sensitive data pattern; and
    assigning the sensitivity score based on the second sensitive data pattern.

20. The computer system of claim 16, wherein comparing the first sensitivity score and the second sensitivity score further comprises:
    computing a difference between the first sensitivity score and the second sensitivity score; and
    identifying a potential malicious activity responsive to a determination that the difference exceeds a predetermined threshold.

* * * * *